(12) United States Patent
van Roermund et al.

(10) Patent No.: US 10,137,859 B2
(45) Date of Patent: Nov. 27, 2018

(54) AUTOMOTIVE SECURITY APPARATUS AND ASSOCIATED METHODS

(71) Applicant: NXP B.V.

(72) Inventors: Timotheus Arthur van Roermund, Hamburg (DE); Claas-Henrik Moeller, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/644,485

(22) Filed: Jul. 7, 2017

(65) Prior Publication Data

US 2018/0056939 A1    Mar. 1, 2018

(30) Foreign Application Priority Data

Aug. 25, 2016 (EP) ..................... 16185691

(51) Int. Cl.
| | |
|---|---|
| *B60R 1/00* | (2006.01) |
| *B60R 25/24* | (2013.01) |
| *B60R 25/04* | (2013.01) |
| *B60R 25/31* | (2013.01) |
| *G08B 13/22* | (2006.01) |
| *G07C 9/00* | (2006.01) |

(52) U.S. Cl.
CPC .............. *B60R 25/24* (2013.01); *B60R 25/04* (2013.01); *B60R 25/245* (2013.01); *B60R 25/31* (2013.01); *G07C 9/00309* (2013.01); *G08B 13/22* (2013.01); *B60R 2325/101* (2013.01); *B60R 2325/103* (2013.01); *B60R 2325/108* (2013.01); *B60R 2325/205* (2013.01); *G07C 2009/00555* (2013.01); *G07C 2209/63* (2013.01)

(58) Field of Classification Search
CPC ......... B60R 25/24; B60R 25/05; B60R 25/31; G08B 13/22
USPC ...... 340/539.1, 539.11, 539.13, 426.1, 426.2, 340/426.19
See application file for complete search history.

(56) References Cited

U.S. PATENT DOCUMENTS

| | | | |
|---|---|---|---|
| 9,799,220 B2 * | 10/2017 | Lin | ............ B60R 25/24 |
| 2012/0268242 A1 | 10/2012 | Tieman et al. | |
| 2015/0161834 A1 | 6/2015 | Spahl | |
| 2015/0291129 A1 | 10/2015 | Saito | |

(Continued)

FOREIGN PATENT DOCUMENTS

| | | |
|---|---|---|
| DE | 100 46 571 A1 | 5/2002 |
| EP | 2 514 643 A2 | 10/2012 |
| EP | 2 813 963 A1 | 12/2014 |

(Continued)

*Primary Examiner* — Daryl Pope
(74) *Attorney, Agent, or Firm* — Rajeev Madnawat (57) ABSTRACT

An automotive security apparatus, comprising: a security-terminal, configured to receive security-location-information representative of a location of the automotive security apparatus or a vehicle key; and a vehicle-location-terminal, configured to receive vehicle-location-information representative of a location of a vehicle, a processor, configured to compare the security-location-information with the vehicle-location-information, and determine a security-condition-signal based on whether the location of the automotive security apparatus or the vehicle key is inside or outside of a predetermined-proximity of the location of the vehicle; and an output-terminal, configured to provide the security-condition-signal.

15 Claims, 3 Drawing Sheets

(56) References Cited

U.S. PATENT DOCUMENTS

2016/0189458 A1 6/2016 Lee et al.
2016/0225260 A1* 8/2016 Lin ................. G08G 1/096791

FOREIGN PATENT DOCUMENTS

| JP | 2005-163522 A | 6/2005 |
| JP | 2008-02140 A | 1/2008 |
| WO | 2012/017214 A1 | 2/2012 |

* cited by examiner

AUTOMOTIVE SECURITY APPARATUS AND ASSOCIATED METHODS

CROSS-REFERENCE TO RELATED APPLICATIONS

This application claims the priority under 35 U.S.C. § 119 of European Patent application no. 16185691.9, filed on Aug 25, 2016, the contents of which are incorporated by reference herein.

The present disclosure relates to automotive security equipment, and in particular, although not necessarily, equipment designed to detect or prevent unauthorised access, use or movement of automotive vehicles.

According to a first aspect of the present disclosure there is provided an automotive security apparatus, comprising:
- a security-terminal, configured to receive security-location-information representative of a location of the automotive security apparatus or a vehicle key; and
- a vehicle-location-terminal, configured to receive vehicle-location-information representative of a location of a vehicle,
- a processor, configured to compare the security-location-information with the vehicle-location-information, and determine a security-condition-signal based on whether the location of the automotive security apparatus or the vehicle key is inside or outside of a predetermined-proximity of the location of the vehicle; and
- an output-terminal, configured to provide the security-condition-signal.

In one or more embodiments, the security-location-information is representative of the location of a vehicle or the vehicle key. It can be a current location or a historical location.

In one or more embodiments, if the location of the automotive security apparatus or the vehicle key is outside of the predetermined-proximity of the location of the vehicle, then the processor is configured to set a mode of operation of the automotive security apparatus.

In one or more embodiments, setting the mode of operation comprises one or more of:
- disabling a Passive Keyless Entry mode of operation associated with the vehicle; and
- setting a security alert mode of operation.

In one or more embodiments, the automotive security apparatus is movable relative to the vehicle.

In one or more embodiments, the automotive security apparatus may further comprise a receiver-terminal configured to receive access-attempt-signalling from the vehicle. The access-attempt-signalling may comprise the vehicle-location-information.

In one or more embodiments, the automotive security apparatus further comprises a memory configured to store vehicle-location-information and associated vehicle-identity-information. The access-attempt-signalling may comprise vehicle-identity-information. The automotive security apparatus may be configured to determine the vehicle-location-information from the memory based on the vehicle-identity-information provided by the access-attempt-signalling. The automotive security apparatus may comprise a transmitter-terminal configured to provide locking-signalling for locking the vehicle as part of a locking-operation. The automotive security apparatus may be configured to store the vehicle-location-information in the memory as part of the locking operation.

In one or more embodiments, when the location of the automotive security apparatus is inside the predetermined-proximity of the location of the vehicle, the processor is configured to provide a positive security-condition-signal to the output-terminal for controlling a transmitter to transmit an access-signal to the vehicle.

In one or more embodiments, the automotive security apparatus further comprises a transmitter configured to transmit the access-signal to the vehicle. The access-signal may be configured to unlock the vehicle.

In one or more embodiments, the automotive security apparatus further comprises a transmitter configured to transmit an immobilizer-signal to the vehicle for releasing an engine immobilizer of the vehicle. The immobilizer-signal may be based on an immobilizer-condition-signal. The processor may be configured to compare the security-location-information with the vehicle-location-information, and determine the immobilizer-condition-signal based on whether or not the location of the automotive security apparatus is inside an internal-proximity of the location of the vehicle.

In one or more embodiments, the automotive security apparatus further comprises a memory configured to store the security-location-information. The security-location-information may be representative of an earlier-location of the vehicle. The vehicle-location-information may be representative of a later-location of the vehicle. The earlier-location of the vehicle may relate to an earlier point in time, while the later-location of the vehicle relates to a later point in time. The automotive security apparatus may be mechanically coupled to the vehicle.

In one or more embodiments, when the vehicle-location-information is representative of a location that is outside the predetermined proximity of the earlier-location, then the processor is configured to provide a negative security-condition-signal to the output-terminal for providing a security alert.

In one or more embodiments, the automotive security apparatus further comprises a detection terminal configured to receive a motion-detection-signal. The automotive security apparatus may be configured to set a non-operation status in response to a vehicle locking event and to un-set the non-operation status in response to a vehicle unlocking event. If the detection terminal receives a motion-detection-signal when the non-operation status is set, and if the location of the automotive security apparatus is outside a predetermined-proximity of the location of the vehicle, then the processor may be configured to provide a negative security-condition-signal to the output-terminal for sending a security alert.

In one or more embodiments, the location of the automotive security apparatus is inside the predetermined-proximity of the location of the vehicle if the location of the automotive security apparatus is less than a predetermined distance from the location of the vehicle.

In one or more embodiments, the security-location-information or the vehicle-location-information further comprises a time-criterion. The processor may be configured to provide the security-condition-signal in accordance with the time-criterion, such that the security-condition-signal is provided to set a mode of operation of the vehicle.

In one or more embodiments, the automotive security apparatus further comprises a transmitter configured to transmit the vehicle-location-information to a remote device for future use as security-location-information when a trigger criterion is satisfied. The trigger criterion may comprises one or more of:
- receiving the vehicle-location-information at the vehicle-location-terminal;

a predetermined time interval having elapsed since a transmission of previous-vehicle-location-information; and a user initiation event occurring.

In one or more embodiments a vehicle and/or a vehicle key may comprise any automotive security apparatus of the present disclosure.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Passive keyless entry (PKE), or Remote Keyless Entry (RKE), is a feature of some vehicles that was introduced by vehicle manufacturers some time ago. The idea of PKE is that the user does not have to use either (i) a mechanical key or (ii) operate any buttons on a key fob or a remote control, in order to open the doors and/or start the engine once inside the vehicle. The presence of the vehicle key in the immediate vicinity of the vehicle, optionally in combination with the user touching the door handle or operating an engine start button inside the vehicle, may be sufficient for the vehicle to execute the desired action.

Some PKE solutions employ a system of two independent communications sub-systems.

First, a low frequency (LF) sub-system, which is fitted to a vehicle, provides a 125 kHz magnetic induction field in the vicinity of the vehicle. This LF signalling is an example of vehicle proximity signalling, which if detected by a key fob may indicate that the vehicle is nearby, given the short range of the signalling. Other systems with a 22 kHz operating frequency may also be employed. The 125 kHz LF system technology may also serve as a fall-back solution for situations when a battery in a key fob is empty or discharged.

Second, a Very High Frequency (VHF) or Ultra High Frequency (UHF) wireless communications sub-system is provided in a key fob. This sub-system is used to verify that a registered key fob is communicating with the vehicle and to provide wireless remote control commands to the vehicle from the key fob. In some examples, the VHF/UHF communication may be bi-directional between the key fob and the vehicle.

A typical range of the LF magnetic induction field outside a vehicle is about 2 metres. The magnetic induction field decays quickly beyond this range and effectively makes it impossible for the vehicle key to detect the LF signal beyond this range. If the vehicle key is located within a predetermined proximity of the vehicle, it can detect the magnetic induction field and will activate the VHF/UHF communications sub-system. Then the vehicle key may exchange messages with the vehicle in order to authenticate itself as a registered, valid, vehicle key. The vehicle in return will accept commands from this vehicle key and/or take appropriate actions in case the user touches one of the door handles or presses the "engine start" button inside the vehicle, for example.

Vehicle equipment manufacturers may desire to enable smartphones to be used for vehicle access and vehicle management or control, for example to enable various forms of vehicle sharing. It may be desirable to develop solutions based on Bluetooth Low Energy (BLE) and other Radio Frequency (RF) technologies, such as Near Field Communication (NFC) or cellular communication technologies.

With compromises on functional safety and convenience, the abovementioned PKE system can also be realized using, for example, BLE systems in mobile phones. Due to certain disadvantages, such as insufficient ability to detect whether a key is inside or outside of a vehicle which can lead to Keyless Go when a key is not inside the vehicle, or reduced coverage around the vehicle or high-cost for multi-anchor systems this is foreseen mainly for vehicle sharing applications, next to the traditional PKE/RKE system.

Generally, PKE systems are vulnerable to so-called relay attacks (which will be described further below). One or more examples described in the present disclosure propose countermeasures that aim at preventing (or at least, detecting) unauthorized access to vehicles, by way of relay attacks or other techniques.

Figure 1:
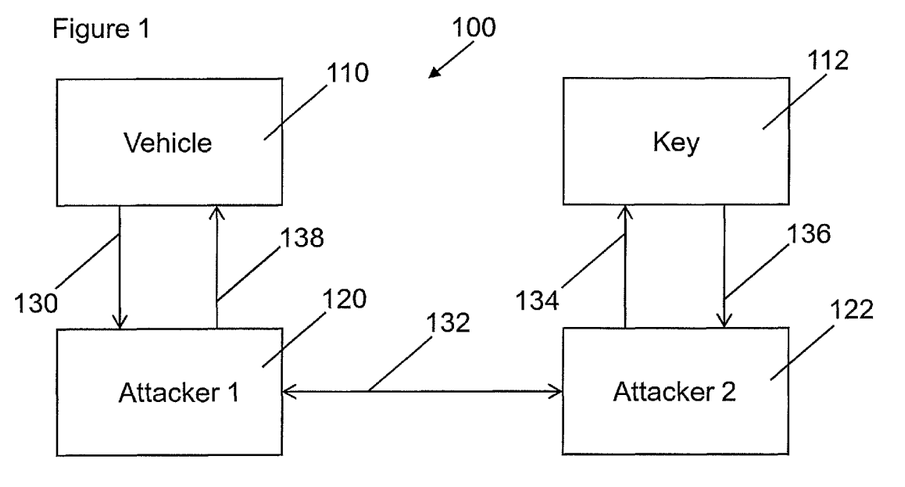
FIG. 1 shows an example vehicle keyless entry system being subjected to a successful relay attack.

FIG. 1 shows a schematic diagram 100 of the information flows involved in a successful relay attack against a keyless entry system. Generally, a relay attack is a type of hacking technique in which communication between a vehicle's immobilizer and the vehicle's key is initiated by the attacker, who then merely relays messages between the two components, without manipulating the messages or even necessarily reading them.

A vehicle 110 is situated in a first location. A key 112 for the vehicle is situated at a second location that is remote from the vehicle's location. The distance between the key 112 and the vehicle 110 is such that they cannot communicate directly with each other using either a low frequency, or very high frequency, sub-system, such as the ones described above. A first attacker 120 is located proximal to the vehicle 110. A second attacker 122 is located proximal to the key 112. The first attacker 120 is close enough to the vehicle 110 to receive the short range LF signal 130 from the vehicle 110. The first attacker 120 wirelessly relays the short range LF signal, by a suitable two-way wireless link 132, to the second attacker 122. The second attacker 122 then transmits 134 the short range LF signal to the key 112. This transmission 134 replicates what the key 112 would receive if located sufficiently close to the vehicle 110. Therefore, the key 112 responds by transmitting the wireless remote control commands 136, such as the VHF or UHF signals discussed above, to enable access to the vehicle 110. The second attacker 122 receives and then relays the wireless remote control commands 136 across the two-way wireless link 132 to the first attacker 120. The first attacker 120 then provides a transmission 138 that replicates the wireless remote control commands 136 transmitted by the key 112. When the vehicle 110 receives the transmission 138 it allows access to the vehicle 110, on the basis that the key 112 appears to be present, even though the key 112 may be located hundreds or even thousands of metres away from the vehicle 110.

In this way, a thief may steal the vehicle 110, or any contents of the vehicle 110, even though the key 112 is in the rightful owner's possession, but is also within RF range of the second attacker 122.

Relay station attacks are one of the main drivers for development of Ultra-Wide-Band (UWB) solutions that can be integrated with traditional PKE/RKE systems, to implement distance bounding and thereby, prevent relay station attacks (RSA) from succeeding. It will be appreciated that one or more of the systems disclosed herein need not necessarily utilise LF and VHF signalling. For example, the functionality of one or more of the embodiments disclosed herein can use Bluetooth Low Energy (BLE), which can be a relatively simple implementation.

Traditional keyless entry systems may be integrated with other mobile electronic devices that a user may have, such as mobile phones or smartphones. Therefore, it can be desirable for smartphone based vehicle access systems to be designed to prevent, or at least detect, relay station attacks. It is desirable to develop systems that may enable smartphones to prevent relay station attacks succeeding without needing technologies like UWB that are not necessarily available on smartphones and/or provide additional cost, hence using other available infrastructure to prevent a successful RSA.

Furthermore, "traditional" vehicle theft remains an important problem. For example, vehicles may be stolen by lifting them onto trailers and then driving the trailer away, thereby circumventing the functionality of an engine immobilizer. A still further type of theft may be attempted by vehicle hacking, such as by entering the internal network of the target vehicle to disable immobilization or by cloning the key fob by reading out the secret key. One or more of these, and other types of vehicle crime may be detected and/or prevented by methods and apparatus disclosed herein.

Figure 2:
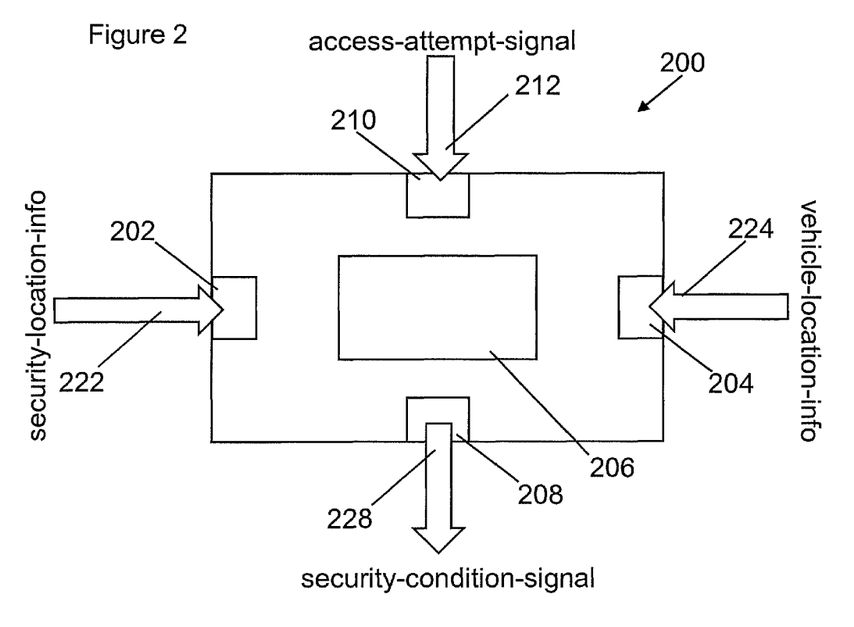
FIG. 2 shows an example embodiment of an automotive security apparatus.

FIG. 2 shows an example embodiment of an automotive security apparatus 200. The automotive security apparatus 200 may be provided as an integrated circuit or other electronic circuit, which may be built into either a vehicle or a vehicle key. Other equivalent embodiments may be provided as software. It will be appreciated that the vehicle key may be any apparatus, such as a smartphone, that is configured to provide authorised access to a vehicle. Such an apparatus may include dedicated circuitry to implement embodiments of the present disclosure, or may implement them using other circuitry and appropriately configured software.

Where the automotive security apparatus 200 is built into a vehicle it may be mechanically coupled to the vehicle in order to prevent it from being removed to circumvent the associated security functionality.

Alternatively, the automotive security apparatus 200 may be built into a mobile device, such as a smartphone or a smart key fob, such that the mobile device may provide the functionality of a vehicle key. In such cases, the automotive security apparatus 200 may be movable relative to a vehicle such that a user may keep the automotive security apparatus 200 on their person in order to use it to unlock/access the vehicle when they are close enough to the vehicle to wish to do so.

The automotive security apparatus 200 has a security-terminal 202, configured to receive security-location-information 222 representative of a location of the automotive security apparatus 200. That is, the security-location-information 222 can be representative of the location of a vehicle or mobile key, and it can be a current location or a historical location, as will be discussed below.

The security-terminal 202 may be coupled to a satellite positioning apparatus, such as a Global Positioning System (GPS) device, that may provide the security-location-information 222. Other satellite based systems, such as GLONASS or Galileo, may be used. Alternatively, the security-location-information 222 may be provided by an inertial guidance system, by dead reckoning, or by some combination of any of the above or any other method known to persons skilled in the art.

The automotive security apparatus 200 also has a vehicle-location-terminal 204, configured to receive vehicle-location-information 224 representative of a location of a vehicle. The location of the vehicle may be determined using any of the techniques described above with respect to the security-location-information 222.

In addition, the security-location-information 222 and/or the vehicle-location-information 224 may be determined, at least in part, based on the presence of wireless infrastructure, such as BLE beacons, WLAN systems, UWB tags, that may wirelessly connect to the automotive security apparatus, either directly or indirectly. In some examples the strength and/or relative strength of different wireless signals may also be used to determine the security-location-information 222 and/or the vehicle-location-information 224. This additional 'environmental awareness' could be used to make location information more accurate, and hence, to further increase the level of security. When multiple inputs are used to determine a location (such as the availability of wireless networks and satellite positioning) then sophisticated attacks involving GPS spoofing (where an attacker sends false GPS signals to manipulate satellite positioning information) may be detected and unauthorised access or use of a vehicle may consequently be prevented.

The automotive security apparatus 200 has a processor 206 configured to compare the security-location-information 222 with the vehicle-location-information 224, and determine a security-condition-signal 228 based on whether the location of the automotive security apparatus 200 is inside, or outside, of a predetermined-proximity of the location of the vehicle. For example, the processor 206 may compute a location-difference-value, based on the security-location-information 222 and the vehicle-location-information 224, that is representative of a distance between the location of the automotive security apparatus 200 and the location of the vehicle. The processor may then compare the location-difference-value with a proximity-threshold. If the location-difference-value is greater than the proximity-threshold then the security-condition-signal 228 may be set to indicate that the automotive security apparatus 200 is outside of the predetermined-proximity. Conversely, if the location-difference-value is less than the proximity-threshold then the security-condition-signal 229 may be set to indicate that the automotive security apparatus 200 is inside of the predetermined-proximity.

In some examples where the automotive security apparatus 200 is part of a mobile device, the location of the automotive security apparatus 200 may be inside the predetermined-proximity of the location of the vehicle if the location of the automotive security apparatus 200 is less than a predetermined distance from the location of the vehicle. The predetermined distance may be based on a furthest distance that wireless signalling may be exchanged between the automotive security apparatus 200 and the vehicle in the absence of any relay station attack. Conversely, the location of the automotive security apparatus 200 may be outside the predetermined-proximity of the location of the vehicle if the location of the automotive security apparatus 200 is greater than a predetermined distance away from the location of the vehicle.

In other examples, discussed further below in relation to FIG. 5, where the automotive security apparatus 200 is part of a vehicle, the automotive security apparatus 200 may be considered to be inside the proximity of the location of the vehicle if the distance between the location of the vehicle at an earlier time, and the location of the automotive security apparatus 200 at a later time, is less than a predetermined distance. This may indicate that the vehicle either: (i) has not been moved during the period between the earlier time and the later time; or (ii) has been displaced, by less than an authorised distance, during the period between the earlier time and the later time. Conversely, if the automotive security apparatus 200 is outside of the predetermined-proximity of the vehicle, then it may indicate that the vehicle either: (i) has been displaced, during the relevant period; or (ii) has been displaced by more than an authorised distance, during the relevant period, for example in case of valet parking. In such an example, the security-location-information 222 is representative of the location of the vehicle at an earlier moment in time, and the vehicle-location-information 224 is representative of the location of the vehicle at a current moment in time.

The security-condition-signal 228 may be set to a secure-value, which indicates that no attempt to circumvent vehicle security has been detected. The secure-value may be set when the location of the automotive security apparatus 200 is inside of the predetermined proximity of the location of the vehicle.

Alternatively, the security-condition-signal 228 may be set to an insecure-value, which indicates that an attempt to circumvent the vehicle security has been detected. The insecure-value may be set when the location of the automotive security apparatus 200 is outside of the predetermined proximity of the location of the vehicle.

The automotive security apparatus 200 also has an output-terminal 208, configured to provide the security-condition-signal 228 to other circuitry (not shown). The security-condition-signal 228 may then be used to either enable or disable certain functionality, based on whether a security violation attempt has been detected, or not.

The automotive security apparatus 200 also has an optional receiver-terminal 210 configured to receive access-attempt-signalling 212 from the vehicle. The access-attempt-signalling 212 may be representative of any attempt to access, or otherwise interact with, the vehicle. As non-limiting examples, the access-attempt-signalling 212 may be representative of: a wireless attempt to unlock or open the vehicle or start the vehicle engine; a physical attempt to unlock, open or start the vehicle, such as by using a physical key, actuating a door handle or boot/trunk release button or an engine start button; a movement of the vehicle, such as a movement of a centre of mass of the vehicle or a vibration detected within the vehicle. In some examples, when the automotive security apparatus 200 is in the key, the access-attempt-signalling 212 may include vehicle proximity signalling, such as may be received from the vehicle as LF signals, when the key is close enough to the vehicle, as discussed above.

Depending on whether the automotive security apparatus 200 is deployed within a vehicle or a vehicle key (which includes a mobile device with vehicle key functionality), the security-location-information 222, the vehicle-location-information 224 (and optionally the access-attempt-signalling 212) may be processed by the processor 206 in different ways to provide the security-condition-signal 228. The security-condition-signal 228 may then be used to enable different security functionality depending on the circumstances.

Figure 3A:
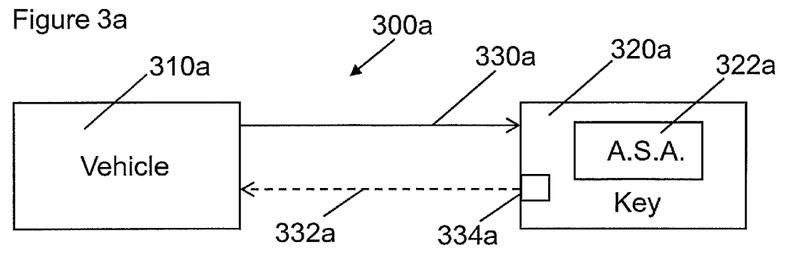
FIG. 3*a* shows an example embodiment of an automotive security apparatus, provided as part of a key, designed to provide a relay attack resistant vehicle keyless entry system.

FIG. 3a shows a schematic diagram 300a of information flows within a system that uses vehicle-location-information representative of a location of a vehicle 310a, and security-location-information representative of a location of a vehicle key 320a, to determine whether the vehicle key 320a may unlock or access the vehicle 310a. It will be appreciated that throughout this disclosure, a vehicle key refers to all kinds of authorized access devices having an embedded or received secret key code capable of authorizing vehicle access, for example, smartphones, conventional or smart keys, wearables or other types of electronic devices.

The vehicle key 320a comprises an automotive security apparatus 322a configured to receive vehicle proximity signalling 330a from the vehicle 310a. The automotive security apparatus 322a is similar to the automotive security apparatus described above in relation to FIG. 2 and may comprise similar components and functionality. Component parts of the automotive security apparatus 322a are not illustrated in FIG. 3a to improve the clarity of the disclosure.

The vehicle proximity signalling 330a is an example of access-attempt-signalling, because the vehicle proximity signalling 330a should only be received by the vehicle key 320a when it is close enough to the vehicle 310a for a user to access the vehicle 310a. The vehicle proximity signalling 330a may be considered a request from the vehicle 310a to the vehicle key 320a to authorise access/unlocking of the vehicle 310a.

The automotive security apparatus 322a receives security-location-information, representative of its own location, from other circuitry (not shown) provided within the vehicle key 322a, such as a GPS chip, for example.

The automotive security apparatus 322a may determine the vehicle-location-information in a variety of ways, as discussed further below. For example, it may use the vehicle proximity signalling 330a in different ways, depending on its information content.

In response to receiving the vehicle proximity signalling 330a, the automotive security apparatus 322a compares the security-location-information (which is representative of the location of the vehicle key 320a) against the vehicle-location-information to determine if the location of the automotive security apparatus 322a (and hence the vehicle key 320a) is inside of, or outside of, a predetermined proximity of the vehicle location. If the automotive security apparatus is located inside of the predetermined proximity, then it may set a security-condition-signal to a secure-value. Based on the security-condition-signal being a secure-value, the key may then provide authorisation-signalling 332a to the vehicle 310a to enable the vehicle 310a to provide access to the vehicle 310a, such as by unlocking the vehicle 310a.

Alternatively, if the automotive security apparatus 322a (and hence the vehicle key 320a) is located outside of the predetermined proximity of the vehicle 310a, then the security-condition-signal may be set to an insecure-value, because a relay attack may have been detected. Based on the security-condition-signal being an insecure-value, the vehicle key 320a may be configured to withhold any authorisation-signalling 332a. In this way, by not providing any authorisation-signalling 332a in response to the vehicle proximity signalling 330a, the automotive security apparatus 322a may prevent a relay attack from succeeding.

The authorisation-signalling 332a is shown as a dashed line to indicate that the authorisation-signalling 332a may, or may not, be provided in response to the vehicle proximity signalling 330a, depending on whether the security-condition-signal is set to a secure-value, or an insecure-value.

The vehicle-location-information is determined based on the access-attempt-signalling in some examples. For instance, the access-attempt-signalling may comprise the location of the vehicle 310a. That is, the location of the vehicle 310a may be embedded in the vehicle proximity signalling 330a that is sent from the vehicle 310a to the vehicle key 320a. In such cases, the vehicle 310a will comprise a suitable positioning system, such as a GPS chip, in order to determine the necessary location information to embed in the vehicle proximity signalling 330a. Optionally, a cryptographically protected representation of the vehicle location may be provided as part of the vehicle proximity signalling 330a. Methods of protecting the representation of the vehicle location may include encryption (confidentiality protection) and/or authentication (integrity/authenticity protection).

Alternatively, when locking the vehicle 310a, the vehicle key 320 may register the location of the vehicle 310 and therefore store the vehicle-location-information in memory for future use as vehicle-location-information. This may be achieved by an exchange of locking signalling, whereby the vehicle key 320a sends a signal instructing the vehicle 310a to lock, and the vehicle 310a sends a confirmation signal confirming that it has executed the locking command and locked the vehicle 310a. The confirmation signal may also comprise a location of the vehicle 310a, based on information from a positioning system on board the vehicle 310a. Alternatively, the vehicle key 320a may store its own location, as the vehicle-location-information, when the locking command is sent, or when a confirmation signal is received from the vehicle 310a, or more generally as part of a locking-operation. This is on the basis that the location of the vehicle key 320a will be similar to or the same as the location of the vehicle 310a when the vehicle is locked. When the vehicle key later on receives an 'unlock' request from the vehicle, for example via NFC or Bluetooth, the vehicle key 320a can check if the vehicle key's location (the security-location-information) matches the previously registered vehicle location. If the two locations do not match because the vehicle key's location is outside of a predetermined proximity of the previously registered vehicle location, then the access-attempt-signalling may have been relayed as part of a relay attack, and the vehicle key 320a will therefore refuse to respond to the request.

To implement a system where the automotive security apparatus 322a registers the vehicle-location-information, the automotive security apparatus 322a may have a memory configured to store vehicle-location-information. Also, the memory may store vehicle-identity-information, associated with the vehicle-location-information, for identifying the vehicle. When access-attempt-signalling is received it may include the vehicle-identity-information. The automotive security apparatus 322a may then determine the vehicle-location-information by matching the vehicle-identity-information from the access-attempt-signalling with the vehicle-identity-information in the memory, and then comparing the vehicle-location-information stored in the memory with received security-location-information. In this way, a single electronic device (key) with such an automotive security apparatus 322a may be designed to operate in conjunction with a plurality of vehicles, by comparing the automotive security apparatus's location with that of the particular vehicle identified in the access-attempt-signalling.

When the location of the automotive security apparatus 322a is inside the predetermined-proximity of the location of the vehicle 310a, a processor (not shown) within the automotive security apparatus 322a, may be configured to provide a positive security-condition-signal to an output-terminal (not shown) within the automotive security apparatus 322a for controlling a transmitter 334a to transmit an access-signal 332a to the vehicle 310a.

In some examples the transmitter 334a may be configured to provide locking-signalling for locking the vehicle 310a as part of a locking-operation. Similarly, the transmitter 334a may also be configured to transmit access-signalling to the vehicle 310a to unlock the vehicle 310a.

In some examples the transmitter 334a may be configured to transmit an immobilizer-signal to the vehicle 310a for releasing an engine immobilizer of the vehicle 310a. The immobilizer-signal may be based on an immobilizer-condition-signal. The processor of the automotive security apparatus 322a may be configured to compare the security-location-information with the vehicle-location-information, and determine the immobilizer-condition-signal based on whether or not the location of the automotive security apparatus 322a is inside an internal-proximity of the location of the vehicle 310a. The internal-proximity may be the volume inside of an external envelope of the vehicle 310a. Thereby, the immobilizer may only be released when the vehicle key 320a is physically inside of the vehicle 310a.

Existing PKE systems are vulnerable to relay attacks. Therefore, registering the location of the vehicle 310a in the vehicle key 320a, as discussed above with respect to FIG. 3a, can provide an increased level of security. This may prevent the vehicle key 320a from automatically responding to a relayed vehicle access signal, when it is not in sufficiently close proximity to the vehicle 310a.

Figure 3B:
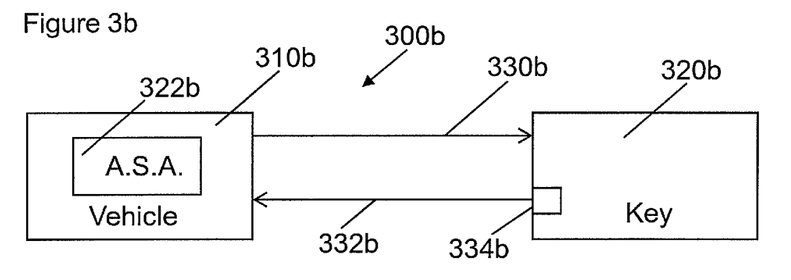
FIG. 3*b* shows an example embodiment of an automotive security apparatus, provided as part of a vehicle, designed to provide a relay attack resistant vehicle keyless entry system.

FIG. 3b shows a schematic diagram 300b that is similar to that of FIG. 3a. Features of FIG. 3b that are similar to features of FIG. 3a have been given corresponding reference numerals and may not necessarily be discussed further here. A key difference between FIGS. 3a and 3b is that in FIG. 3b a vehicle 310b contains an automotive security apparatus 322b, while an associated vehicle key 320b does not.

The vehicle 310b is configured to transmit vehicle proximity signalling 330b. The vehicle key 320b, on receiving the vehicle proximity signalling 330b, is configured to respond by transmitting authorisation-signalling 332b to the vehicle 310b. The authorisation-signalling 332b in this example contains security-location-information, optionally cryptographically protected, that is representative of the location of the vehicle key 320b, which may be provided by, for example, a GPS chip or other circuitry (not shown) associated with the vehicle key 320b.

The automotive security apparatus 322*b* receives the authorisation-signalling 332*b* and compares the security-location-information with vehicle-location-information that the automotive security apparatus 322*b* receives from a GPS chip or other positioning circuitry (not shown) within the vehicle 310*b*. If the location of the vehicle key 320*b* is thereby determined to be inside of a predetermined proximity of the vehicle 310*b* then the automotive security apparatus 322*b* may set a security-condition-signal to a secure-value. Based on receiving the secure-value, the automotive security apparatus 322*b* may unlock the vehicle to allow access. Alternatively, if the location of the vehicle key 320*b* is determined to be outside of a predetermined proximity of the vehicle 310*b* then the automotive security apparatus 322*b* may set a security-condition-signal to an insecure-value. Based on receiving or determining the insecure-value, the vehicle 310*b* may refuse to grant access by not unlocking the vehicle 310*b*. In this way, a relay station attack may be detected and prevented by the automotive security apparatus 312*b* within the vehicle 310*b*.

It will be appreciated that in other examples (not illustrated), both a vehicle and an associated vehicle key may contain respective automotive security apparatuses, with functionality as described herein in relation to both FIGS. 3*a* and 3*b*. In this way, desirable redundancy can be provided, and/or a double check on the security of the vehicle can be achieved.

Figure 4:
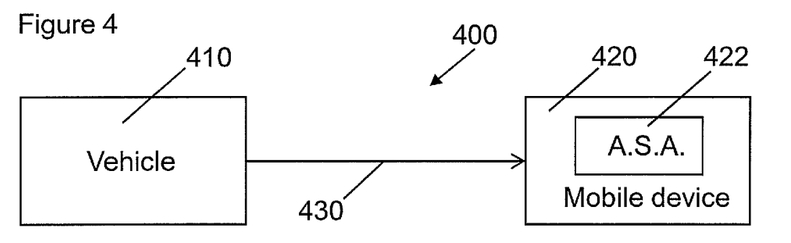
FIG. 4 shows an example embodiment of an automotive security apparatus, provided as part of a mobile device, designed to provide a security alert to a remote user in response to an attempt to access a vehicle.

FIG. 4 shows a schematic diagram 400 of a system in which a vehicle 410 is configured to send an access-attempt-message 430 to an automotive security apparatus 422 that is provided within a mobile device 420. The access-attempt-message 430 may be sent when someone attempts to access the vehicle 410. The access-attempt-message 430 is another example of access-attempt-signalling.

An attempt to access the vehicle 410 may include any wireless attempt to access the vehicle 410, or any physical attempt to access the vehicle 410, such as by opening a door or the trunk. The vehicle 410 may have sensors configured to detect such access attempts and provide a trigger signal when an access attempt is detected. Based on receiving a trigger signal, a security system within the vehicle may send the access-attempt-message 430 to the mobile device 420, using any suitable communications protocol. On receiving the access-attempt-message 430, the automotive security apparatus 422, within the mobile device 420 checks, based on its own position and a registered position of the vehicle 410, whether the automotive security apparatus 422 is nearby the vehicle 410. In some examples, the registered position of the vehicle 410 may have been determined when the vehicle 410 was locked. This check is made by comparing security-location-information with vehicle-location-information. If the automotive security apparatus 422, and therefore the mobile device 420, is within a predetermined proximity of the vehicle 410, this may imply that the user of the mobile device 420 may be the one who is attempting to access the vehicle 410. Alternatively, if the mobile device 420 is outside of the predetermined proximity of the vehicle 410, then this may imply that someone else is attempting to gain access to the vehicle 410. In this latter case, the automotive security apparatus 422 may set an insecure-value for a security-condition-signal. Based on the security-condition-signal being an insecure-value, the mobile device 420 may provide a warning to the user by providing an alarm signal, for example. However, when the automotive security apparatus 422 is within the predetermined proximity of the vehicle 410, a secure-value of the security-condition-signal may instead be set, and the mobile device 420 may consequently not provide any security alert to the user in response to the received access-attempt-message 430. This may advantageously avoid the mobile device 420 sending spurious security alerts to the user.

Any kind of wireless connection between the vehicle 410 and the mobile device 420 can be used to transmit the access-attempt-message 430. A typical example would be a cellular connection, provided by a telematics unit inside the vehicle 410, connecting to the mobile device 420 via a mobile telecommunications network.

Providing a security alert in the manner described herein may provide an effective countermeasure to attempts to achieve unauthorised access to the vehicle 410, as the user may be actively notified of unauthorized access to the vehicle 410 in real time. The user may then take appropriate steps to prevent unauthorized use of the vehicle 410, such as by remotely engaging an engine immobilizer or informing law enforcement authorities.

Figure 5:
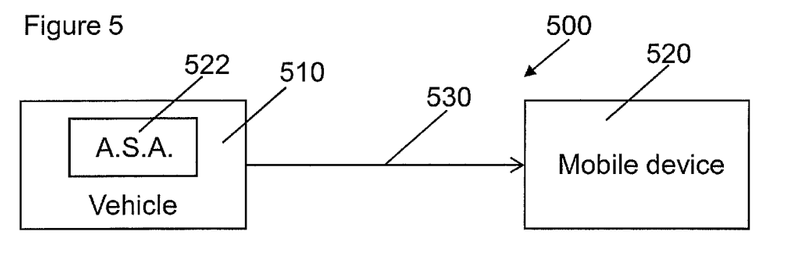
FIG. 5 shows an example embodiment of an automotive security apparatus, provided as part of a vehicle, designed to provide a security alert to a remote user in response to unauthorised use of the vehicle.

FIG. 5 shows a schematic diagram 500 of a vehicle 510 that contains an automotive security apparatus 522 of the present disclosure. The automotive security apparatus 522 is configured to send an access-warning-message 530 to a user's mobile device 520 in the event of unauthorized movement of the vehicle 510 when in a non-operational state. The mobile device 520 may then provide a security alert to the user.

In this example, a vehicle status, stored in, or accessible by, the automotive security apparatus 522 may be set to a non-operational state such as 'non-move' and/or 'non-access', or an operational state such as "active". The status may be set as a non-operational state either manually by the user, or automatically by conventional RKE/PKE systems or Smartphone Locking, when the user leaves/locks the vehicle 510. Similarly, the status may be set as an operational state when a user unlocks the vehicle.

When the vehicle 510 enters the non-operational state, the automotive security apparatus registers its own location. If the location at a later moment changes, beyond a predetermined threshold amount, while the vehicle is still in a non-operational state, then the automotive security apparatus 522 sends the access-warning-message 530 to the mobile device 520.

To implement this security functionality, the automotive security apparatus 522 has a memory (not shown) configured to store security-location-information. The security-location-information is representative of an earlier-location of the vehicle, for example at a point in time when the vehicle 510 was locked. In this example, the vehicle-location-information is representative of a later-location of the vehicle, for example a current location. The earlier-location of the vehicle relates to an earlier point in time while the later-location of the vehicle relates to a later point in time. By comparing the security-location-information against the vehicle-location-information, the automotive, security apparatus 522 may determine if the later (or present time) location of the vehicle is inside a predetermined proximity of the earlier-location of the vehicle. If it is inside the predetermined proximity, then no unauthorised movement is detected. However, if the later location is outside of the predetermined proximity of the earlier location then unauthorised use, or movement, is detected and the access-warning-message 530 is sent to the mobile device 520 in order to provide a security alert to the user.

Location checks by the automotive security apparatus 522 may be performed periodically or regularly, such as according to a predetermined schedule.

Additionally or alternatively, a location check may be performed in response to receipt of a trigger signal. Such a trigger signal may be set, for example, based on motion sensing information which may detect vibrations that may be non-typical for a stationary vehicle. Performing location checks in response to a trigger signal can save battery power.

To implement motion sensing functionality, the automotive security apparatus 522 may have a detection terminal configured to receive a motion-detection-signal. As indicated above, the automotive security apparatus 522 may be configured to set a non-operation status in response to a vehicle locking event and to un-set the non-operation status in response to a vehicle unlocking event. If the detection terminal receives a motion-detection-signal when the non-operation status is set, then a processor within the automotive security apparatus 522 may be configured to check whether or not the location of the automotive security apparatus 522 is outside a predetermined-proximity of the location of the vehicle 510. If the automotive security apparatus 522 is outside the predetermined-proximity, then the processor may provide a negative security-condition-signal to an output-terminal of the automotive security apparatus 522 for initiating the sending of a security alert for the user.

To notify the user, any kind of wireless connection can be used to send the access-warning-message 530 between the vehicle 510 and the mobile device 520.

Instead of, or in addition to, sending the access-warning-message 530, the automotive security apparatus 522 may initiate other functionality, such as shutting down certain functions of the vehicle 510 (for example by engaging an engine immobilizer), tracking vehicle movements and providing the tracking data to the user or a third party, or notifying police or other law enforcement organisations.

Also, certain authorized use cases can be controlled by an automotive security apparatus of the present disclosure. For example, parking by a valet may be allowed by setting the predetermined proximity to enable the vehicle 510 to move within a predetermined area or distance, such as within a car park. The valet may move the vehicle 510 within the predetermined proximity without the automotive security apparatus 522 determining that any security violation has occurred. In this way, if the vehicle 510 is moved outside of a predetermined proximity of the automotive security apparatus 522, then the vehicle 510 immobilizer may be engaged to prevent further unauthorised movement of the vehicle 510. However, where the vehicle 510 is moved only within the predetermined proximity, the movement may be deemed authorised and therefore allowed.

In some examples, an automotive security apparatus of the present disclosure may be used with remote parking, in which a user may provide instructions to their vehicle, while the user may be outside of the vehicle, such that the car manoeuvres itself into a car parking space. This may enable parking in spaces that are too small to allow the vehicles doors to be opened, fully or partially, once in the parking position. The automotive security apparatus may also enable the user to manoeuvre their vehicle out of a parking space without the user needing to get into the vehicle. In such an example, the predetermined proximity between the automotive security apparatus and the user's key may be limited to a predetermined radius such as 5 or 10 metres, for instance. In some examples the predetermined proximity may be limited to small ranges to ensure line-of-sight range is maintained between the vehicle and the user. Therefore, if the key (or mobile device that acts as a key) is too far away from the vehicle, the vehicle may not be remote controlled such that it can automatically move into a parking space or out from a parking space.

Automotive security apparatus of the present disclosure may be implemented as part of smart key fobs, which may have 2-way vehicle-to-key communication or wireless connections to other networked infrastructure.

It may be desirable to provide an automotive security apparatus of the present disclosure as an integral part of a mobile phone, as mobile phones may have the functionality required to determine their position already (based on GPS technology, or the proximity of wireless networks, etc.). This may be in contrast to key fobs, which may not have such location based functionality.

In some examples, any automotive security apparatus of the present disclosure may optionally have a combination of the functions described herein. For example, the automotive security apparatus may be configured to prevent access to a vehicle when a user's mobile device is not in appropriate proximity to the vehicle, and may also be configured to send an alarm signal to the user's mobile device if the vehicle moves when it is set in a non-move state.

Figure 6:
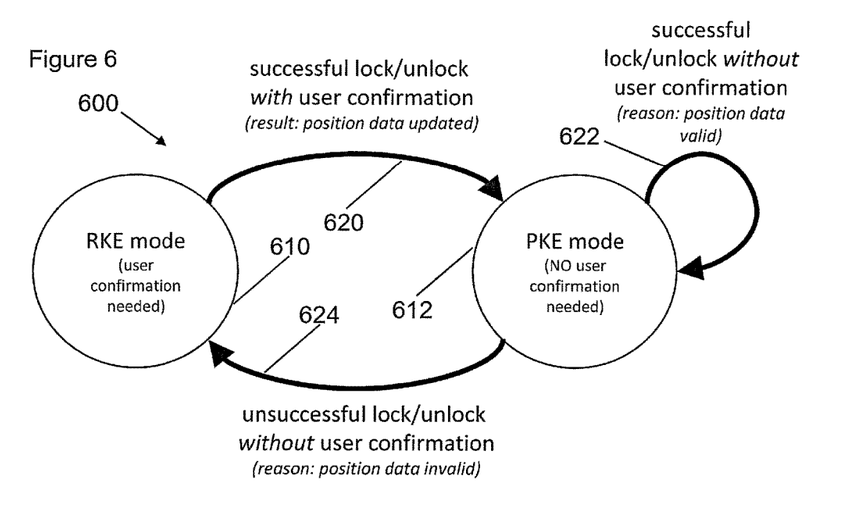
FIG. 6 shows an example embodiment of a state diagram of an automotive security apparatus.

FIG. 6 shows a state diagram 600 for an automotive security device that can operate in two modes:
- A first mode of operation 610, in which Remote Keyless Entry 610 (RKE) is enabled, and Passive Keyless Entry 612 (PKE) is disabled. In FIG. 6, this mode of operation is illustrated as RKE mode.
- A second mode of operation 612, in which Passive Keyless Entry 612 (PKE) is enabled, and Remote Keyless Entry 610 (RKE) is enabled. In FIG. 6, this mode of operation is illustrated as PKE mode.

RKE requires user confirmation, such as a press of a button on a key device, to initiate a locking or unlocking operation. In this example, RKE is enabled for both modes of operation, and does not require any location checking for a user to access their vehicle. Provided the user has the key device in their possession, a relay attack cannot be made using RKE because the attacker will not be able to press the button on the key device. Conversely, PKE does not require user input at the key device, but in this example does require valid vehicle/security-location-information in order to access the vehicle, as discussed above.

An example use scenario will now be discussed below with reference to FIG. 6, in which two keys are to be used with the same vehicle. In this example, automotive security devices are associated with the keys, as described with reference to FIG. 3a.

A first key is used to lock a vehicle. As part of the locking operation, vehicle-location-information is determined and stored in memory associated with the key for future use as security-location-information. Consequently, the first key can subsequently access the vehicle in PKE mode, assuming that the vehicle has not moved, because the location of the key when the subsequent access attempt is made (which is an example of security-location-information) will be sufficiently close to the stored vehicle-location-information. This is shown in FIG. 6 as a transition 622 that maintains the key in the PKE mode 612 in response to a successful lock/unlock by a PKE operation. Such an operation does not require user confirmation at the key (by pressing a button on the key), but does require position data to be considered valid.

However, a second key, that was not used to lock the vehicle, may not have the required vehicle-location-information to access the vehicle using PKE when the key is in the PKE mode 612. This is because the stored vehicle-location-information associated with the second key will relate to the last location at which the second key was used to lock the vehicle (which is assumed to be different to the current location of the vehicle). Therefore, the stored vehicle-location-information for the second key will not be close enough to the location of the second key (the security-location-information) when the access attempt is made. This is shown in FIG. 6 as a transition 624 that changes the mode of operation of the key from the PKE mode 612 to the RKE mode 610 in response to an unsuccessful lock/unlock by a PKE operation. Such an operation does not require user confirmation at the key (by pressing a button on the key), but does require position data to be considered valid. In this instance, since the position data was invalid, PKE is disabled by changing to the RKE mode 610.

The second key may be used to successfully access the vehicle when it is in the RKE mode 610 using RKE but not using PKE. This is because RKE does not require consideration of any position data. When the second key is used to lock or unlock the vehicle using RKE, the second key can obtain up-to-date vehicle-location-information in the same way as discussed above with reference to FIG. 3a and the second key and/or the vehicle may undergo a transition 620 from the RKE mode 610 to the PKE mode 612 in order to enable PKE for future operations by the second key. Once in the PKE mode 612, the second key device may operate using either Passive Keyless Entry or Remote Keyless Entry.

It will be appreciated that the functionality of FIG. 6 can also be performed by an automotive security apparatus that is associated with the vehicle, as shown in FIG. 3b. In which case, the vehicle can be put into a PKE mode 612 or an RKE mode 610 such that it operates in the same way for all keys. Generally, if the location of the automotive security apparatus is outside of the predetermined-proximity of the location of the vehicle, then the processor (within the automotive security apparatus) may be configured to set a mode of operation of the automotive security apparatus. If the vehicle or key device is in the PKE mode of operation 612, then the automotive security apparatus may set it's mode of operation to the RKE mode of operation 610. In this way, as discussed above, PKE is disabled such that the vehicle and/or an associated key device ceases to provide PKE functionality.

In this way, the security-condition-signal may be provided to set a mode of operation of the vehicle. For example, the security-condition-signal may disable PKE may set a security alert mode of operation. In such a security alert mode of operation, the automotive security apparatus may provide a security alert to a user.

Figure 7:
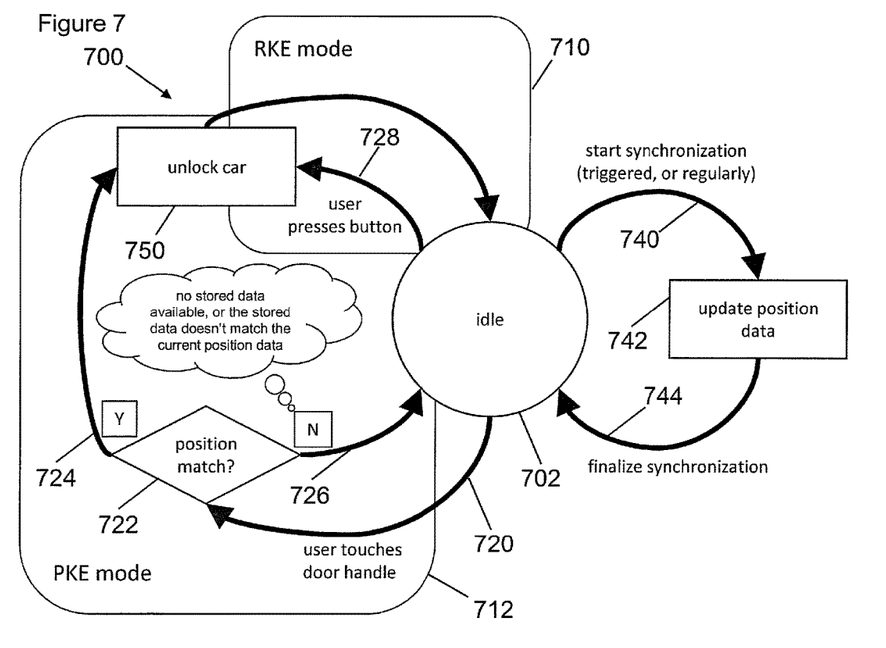
FIG. 7 shows an example embodiment of a flow diagram depicting information flows for an automotive security apparatus.

FIG. 7 shows a flow diagram 700 that depicts information flows according to an embodiment of the present disclosure. In this example, security-location-information can be synchronized between multiple keys such that each key can be used for PKE.

By synchronizing the security-location-information between a first key and a second key, it may be possible to enable the second key to operate in PKE mode, even when it was not the most recent key used to lock the vehicle. This embodiment can use a (secure) synchronization mechanism, such as a secure transfer between the two keys via Near Field Communication (NFC) protocols or other methods. In some examples, cloud computing techniques can be used such that a plurality of key devices can access up-to-date security-location-information or vehicle-location-information. This may enable a key that has been used to lock a particular vehicle to upload its current vehicle-location-information to a cloud server for use as subsequent security-location-information or vehicle-location-information, and for other users with other keys to then download the location-information to their key from the cloud server, provided they have the appropriate authorisation to do so.

In FIG. 7, an idle state is represented by block 702, during which no lock or unlock operations of a vehicle are in progress. The vehicle can be unlocked using RKE, as shown with block 710 in FIG. 7. Also, the vehicle can be unlocked using PKE (or attempted to be unlocked with PKE), as shown with block 712 in FIG. 7. In the following description, the automotive security apparatus is associated with the vehicle.

When the key device is in PKE mode 712, a user may touch a sensor on the door handle of their vehicle 720 and thereby seek to initiate an automotive security apparatus (embedded within the vehicle) to access the vehicle using the PKE mode 712. The key device may therefore provide security-location-information to the automotive security apparatus within the vehicle. The automotive security apparatus then makes a decision 722 as to whether the provided security-location-information matches the vehicle's actual location. If there is a match, then the automotive security apparatus sends an unlocking signal 724 to the vehicle's lock system and thereby unlocks the vehicle 750. Alternatively, if there is not a valid match, the automotive security system may return to an idle state 702. Optionally, the vehicle may send a no-match signal back to the key device.

The user may also access the vehicle by providing an RKE-unlocking-signal 728 by, for example, pressing a button on the key device. The RKE-unlocking-signal 728 may cause the vehicle's lock system to unlock the vehicle 750.

In response to unlocking the vehicle, the automotive security system may provide current vehicle-location-information to the key device for storing as vehicle-location-information or security-location-information to enable it to successfully use PKE for future operations. Alternatively, the automotive security system may only provide the vehicle-location-information when the key device is subsequently used to lock the vehicle. After the vehicle has been locked, the system returns to the idle state 702.

When the key device has received vehicle-location-information, it may provide a location-information-update signal 740 to a remote device. The remote device 742 could be another key device, or a remote computer server such as a cloud server.

The remote device then updates centrally-stored-location-information with the received vehicle-location-information such that the centrally-stored-location-information can be used for subsequent access attempts. In response to the remote device updating the centrally-stored-location-information, in some examples it can transmit an updated location-information signal to one or more automotive security devices, such as to one or more key devices or to a vehicle embedded automotive security device.

In some examples, an automotive security apparatus (whether embedded in the vehicle or the key device) may have a transmitter configured to transmit the vehicle-location-information 740 to a remote device when a trigger criterion is satisfied.

Providing the location-information-update signal 740 may be triggered automatically, such as in response to the key device receiving new vehicle-location-information, or it may occur automatically at regular time intervals, or it may occur in response to a user triggering the update.

The trigger criterion may be a user initiation event occurring, such as a user attempting to access the vehicle, such as by using a PKE mode of operation, or an RKE mode of operation, or by touching a sensor on the vehicle, which might be associated with a door handle or other external vehicle component. In other examples, the user initiation event may include the user selecting an update option on a user interface of a device associated with the user, which may optionally also have key device functionality, such as a key-enabled-smartphone.

In some examples, authorization of RKE functionality can be also controlled by comparing security-location-information with vehicle-location-information in a similar way to that discussed above with reference to PKE functionality. Security-location-information may also be synchronized in a similar way to that described with reference to FIG. 7. In this way, the RKE mode of operation may also be disabled if the vehicle-location-information does not match the security-location-information. This may prevent a successful relay attack when an attacker has obtained physical control over the user's key device, such as by picking the user's pocket, and then attempting to send the unlocking information to the vehicle over a wireless relay, in an attempt to allow rapid unauthorised access to the vehicle.

The authorization of a key device to enable it to use RKE or PKE may, in some examples, also be time limited. That is, the authorization may enable temporary access rights to a vehicle. For example, a key device used by a valet to perform valet parking may be authorised to access and move a vehicle, but only for a limited period of time, such as five or ten minutes. In another example, time limiting access may be useful for vehicle sharing applications. Such time limiting may provide an additional level of security in preventing unauthorised removal of a vehicle from a particular area.

In such examples, the security-location-information or vehicle-location-information may further comprise a time-criterion. The time-criterion may define a specific time in the future at which a user's access expires. In some examples, the time-criterion may be a time-window, a predetermined time interval, or an expiry-time.

The processor, of the automotive security apparatus, may be configured to provide the security-condition-signal in accordance with the time-criterion. For example, the processor may compare the time-criterion to a present time provided by a timing circuit coupled to the automotive security apparatus. When the present time matches or exceeds the time-criterion the processor may set the security-condition-signal to an insecure-value.

The security-condition-signal may be provided to set a mode of operation of the vehicle. For example, if the security-condition-signal is an insecure-value, then the vehicle and/or a key may be set such that PKE is disabled, as discussed above. In this way, PKE operation may be enabled for a limited time only. Alternatively, if the security-condition-signal is an insecure-value then the automotive security apparatus may not provide any output signals for continuing a vehicle access operation (such as locking, unlocking, or starting the engine).

In summary, it may be very beneficial for end users, insurance companies, vehicle makers and society in general if unauthorized vehicle movement can be detected and/or prevented in accordance with disclosures provided herein.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An automotive security apparatus, comprising:
    a security-terminal, configured to receive security-location-information representative of a location of the automotive security apparatus or a vehicle key; and
    a vehicle-location-terminal, configured to receive vehicle-location-information representative of a location of a vehicle,
    a processor, configured to compare the security-location-information with the vehicle-location-information, and determine a security-condition-signal based on whether the location of the automotive security apparatus or the vehicle key is inside or outside of a predetermined-proximity of the location of the vehicle; and an output-terminal, configured to provide the security-condition-signal.

2. The automotive security apparatus of claim 1, wherein if the location of the automotive security apparatus or the vehicle key is outside of the predetermined-proximity of the location of the vehicle, then the processor is configured to set a mode of operation of the automotive security apparatus.

3. The automotive security apparatus of claim 2, wherein setting the mode of operation comprises one or more of:
  disabling a Passive Keyless Entry mode of operation associated with the vehicle; and
  setting a security alert mode of operation.

4. The automotive security apparatus of claim 1, wherein the automotive security apparatus is movable relative to the vehicle, and further comprises a receiver-terminal configured to receive access-attempt-signalling from the vehicle.

5. The automotive security apparatus of claim 4, wherein the access-attempt-signalling comprises the vehicle-location-information.

6. The automotive security apparatus of claim 4, further comprising:
  a memory configured to store vehicle-location-information and associated vehicle-identity-information, wherein:
    the access-attempt-signalling comprises vehicle-identity-information; and
    the automotive security apparatus is configured to determine the vehicle-location-information from the memory based on the vehicle-identity-information provided by the access-attempt-signalling; and
  a transmitter-terminal configured to provide locking-signalling for locking the vehicle as part of a locking-operation,
  wherein the automotive security apparatus is configured to store the vehicle-location-information in the memory as part of the locking operation.

7. The automotive security apparatus of claim 1, wherein when the location of the automotive security apparatus is inside the predetermined-proximity of the location of the vehicle, the processor is configured to provide a positive security-condition-signal to the output-terminal for controlling a transmitter to transmit an access-signal to the vehicle.

8. The automotive security apparatus of claim 7, further comprising a transmitter configured to transmit the access-signal to the vehicle, wherein the access-signal is configured to unlock the vehicle.

9. The automotive security apparatus of claim 7, further comprising:
  a transmitter configured to transmit an immobilizer-signal to the vehicle for releasing an engine immobilizer of the vehicle, the immobilizer-signal based on an immobilizer-condition-signal,
  wherein the processor is configured to compare the security-location-information with the vehicle-location-information, and determine the immobilizer-condition-signal based on whether or not the location of the automotive security apparatus is inside an internal-proximity of the location of the vehicle.

10. The automotive security apparatus of claim 1, further comprising a memory configured to store the security-location-information, wherein:
  the security-location-information is representative of an earlier-location of the vehicle;
  the vehicle-location-information is representative of a later-location of the vehicle;
  the earlier-location of the vehicle relates to an earlier point in time while the later-location of the vehicle relates to a later point in time; and
  wherein the automotive security apparatus is mechanically coupled to the vehicle.

11. The automotive security apparatus of claim 1, wherein, when the vehicle-location-information is representative of a location that is outside the predetermined proximity of the earlier-location, then the processor is configured to provide a negative security-condition-signal to the output-terminal for providing a security alert.

12. The automotive security apparatus of claim 1, further comprising a detection terminal configured to receive a motion-detection-signal, wherein:
  the automotive security apparatus is configured to set a non-operation status in response to a vehicle locking event and to un-set the non-operation status in response to a vehicle unlocking event; and
  if the detection terminal receives a motion-detection-signal when the non-operation status is set, and if the location of the automotive security apparatus is outside a predetermined-proximity of the location of the vehicle, then the processor is configured to provide a negative security-condition-signal to the output-terminal for sending a security alert.

13. The automotive security apparatus of claim 1, wherein the location of the automotive security apparatus is inside the predetermined-proximity of the location of the vehicle if the location of the automotive security apparatus is less than a predetermined distance from the location of the vehicle.

14. The automotive security apparatus of claim 1, wherein the security-location-information or the vehicle-location-information further comprises a time-criterion, and wherein the processor is configured to provide the security-condition-signal in accordance with the time-criterion, such that the security-condition-signal is provided to set a mode of operation of the vehicle.

15. The automotive security apparatus of claim 1, further comprising a transmitter configured to transmit the vehicle-location-information to a remote device for future use as security-location-information when a trigger criterion is satisfied, wherein the trigger criterion comprises one or more of:
  receiving the vehicle-location-information at the vehicle-location-terminal;
  a predetermined time interval having elapsed since a transmission of previous-vehicle-location-information; and
  a user initiation event occurring.

* * * * *